(12) United States Patent
Nagy

(10) Patent No.: US 6,554,352 B2
(45) Date of Patent: Apr. 29, 2003

(54) CROSS CAR SUPPORT STRUCTURE

(75) Inventor: Louis A. Nagy, Scarborough (CA)

(73) Assignee: Van-Rob Stampings Inc., Aurora (CA)

( * ) Notice: Subject to any disclaimer, the term of this patent is extended or adjusted under 35 U.S.C. 154(b) by 0 days.

(21) Appl. No.: 09/977,932

(22) Filed: Oct. 17, 2001

(65) Prior Publication Data

US 2003/0034672 A1 Feb. 20, 2003

(30) Foreign Application Priority Data

Aug. 17, 2001 (CA) ............................................. 2355516

(51) Int. Cl.$^7$ ............................................. B60R 27/00
(52) U.S. Cl. ...................... 296/203.02; 296/70; 296/72; 296/194; 296/208; 180/90; 280/752
(58) Field of Search ............................. 296/70, 72, 192, 296/194, 203.02, 208; 180/90; 280/752

(56) References Cited

U.S. PATENT DOCUMENTS

| | | | | |
|---|---|---|---|---|
| 4,432,656 A | * | 2/1984 | Allmendinger | 116/206 |
| 5,088,571 A | | 2/1992 | Burry et al. | |
| 5,238,286 A | * | 8/1993 | Tanaka et al. | 296/70 |
| 5,282,637 A | * | 2/1994 | McCreadie | 296/194 |
| 5,354,114 A | | 10/1994 | Kelman | |
| 5,549,344 A | * | 8/1996 | Nishijima et al. | 180/90 |
| 5,564,769 A | * | 10/1996 | Deneau et al. | 180/90 |
| 5,673,964 A | * | 10/1997 | Roan et al. | 296/194 |
| 5,762,395 A | | 6/1998 | Merrifield et al. | |
| 5,868,426 A | * | 2/1999 | Edwards et al. | 180/90 |
| 5,931,520 A | * | 8/1999 | Seksaria et al. | 296/70 |
| 5,934,733 A | * | 8/1999 | Manwaring | 296/72 |
| 5,934,744 A | * | 8/1999 | Jergens et al. | 296/192 |
| 5,951,045 A | * | 9/1999 | Almefelt et al. | 180/90 |
| 5,979,965 A | * | 11/1999 | Nishijima et al. | 180/90 |
| 6,045,444 A | | 4/2000 | Zima | |
| 6,213,504 B1 | * | 4/2001 | Isano et al. | 296/70 |
| 6,237,956 B1 | * | 5/2001 | Haba et al. | 180/90 |
| 6,250,678 B1 | * | 6/2001 | Yoshinaka et al. | 180/90 |
| 6,315,347 B1 | * | 11/2001 | Gotz | 296/72 |
| 6,351,962 B1 | * | 3/2002 | Mizutani et al. | 180/90 |
| 6,371,551 B1 | * | 4/2002 | Hedderly | 296/70 |
| 6,382,695 B1 | * | 5/2002 | Decome | 256/72 |
| 6,391,470 B1 | * | 5/2002 | Schmieder et al. | 296/72 |
| 6,394,527 B2 | * | 5/2002 | Ohno et al. | 296/194 |
| 6,409,590 B1 | * | 6/2002 | Suzuki et al. | 296/70 |

* cited by examiner

Primary Examiner—D. Glenn Dayoan
Assistant Examiner—Lori L Coletta
(74) Attorney, Agent, or Firm—Riches, McKenzie & Herbert LLP

(57) ABSTRACT

A cross car structure member including a beam comprising a hollow extended aluminum metal tube extending across the vehicle between the vehicle pillars, preferably, with the interior of the tube being used as a heating, ventilating and air conditioning duct.

15 Claims, 4 Drawing Sheets

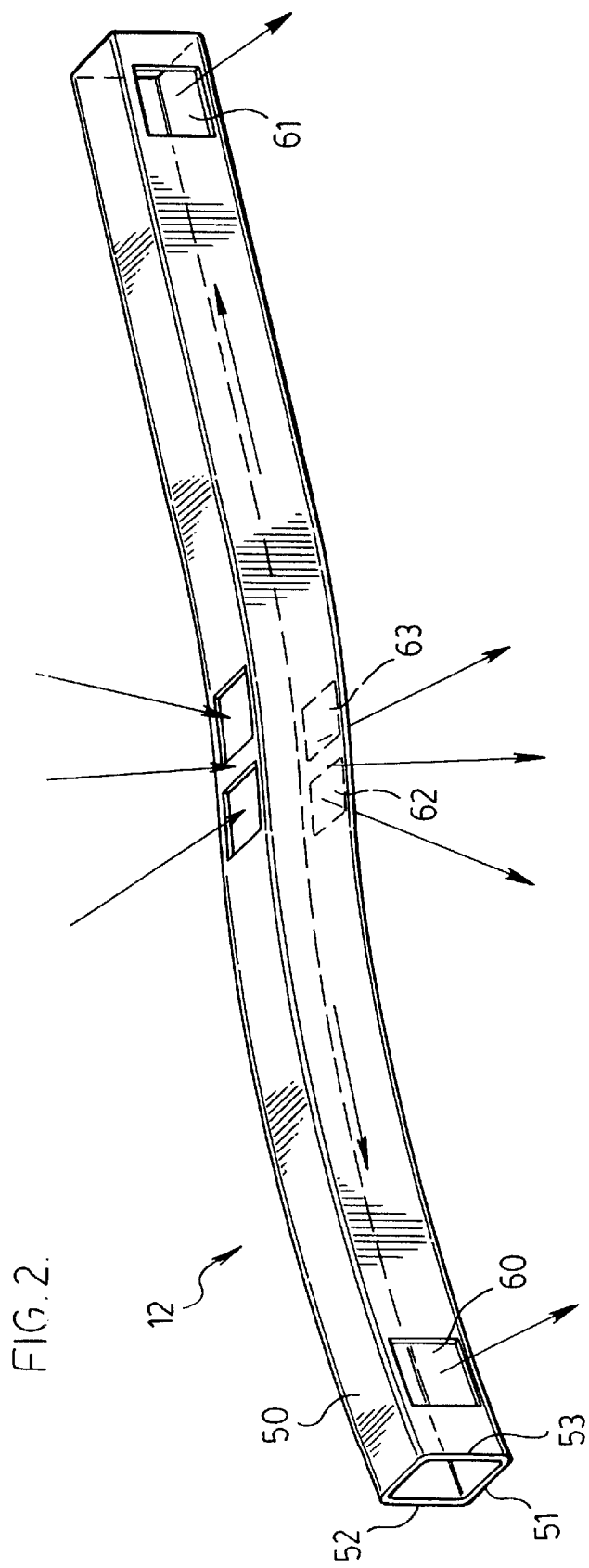

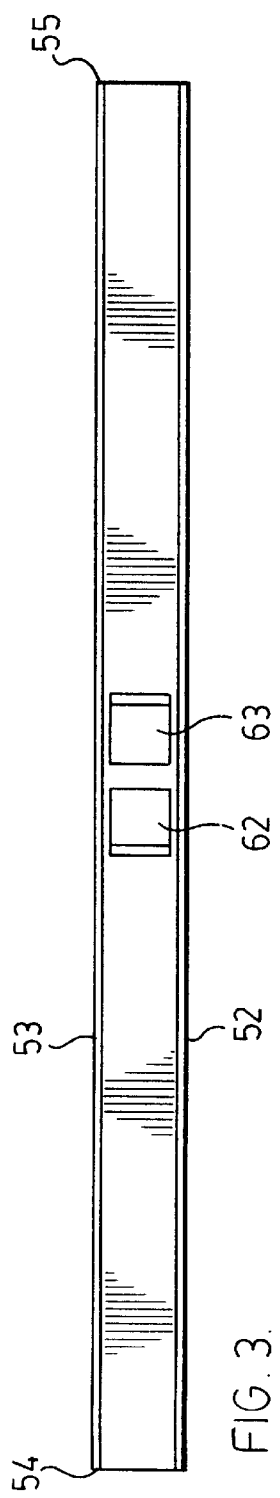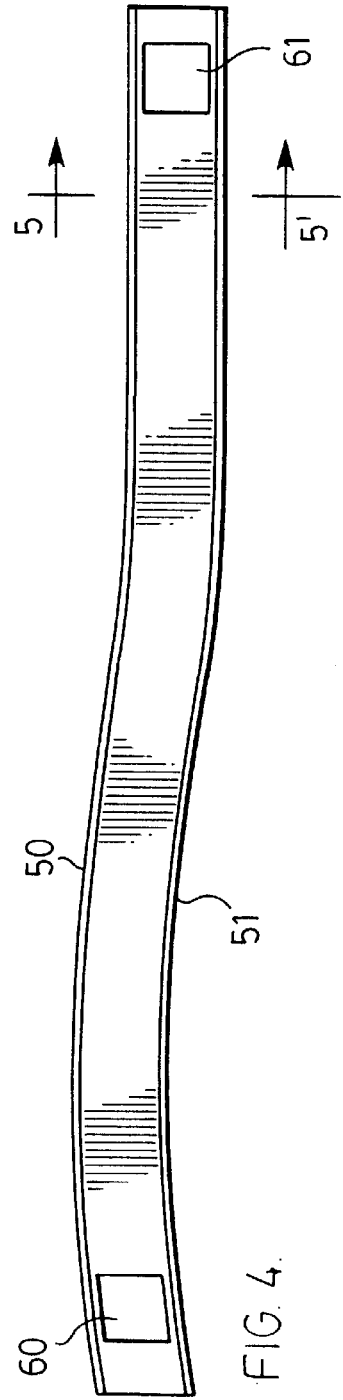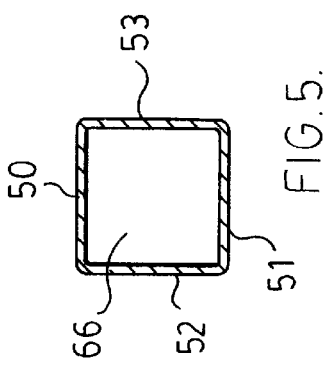

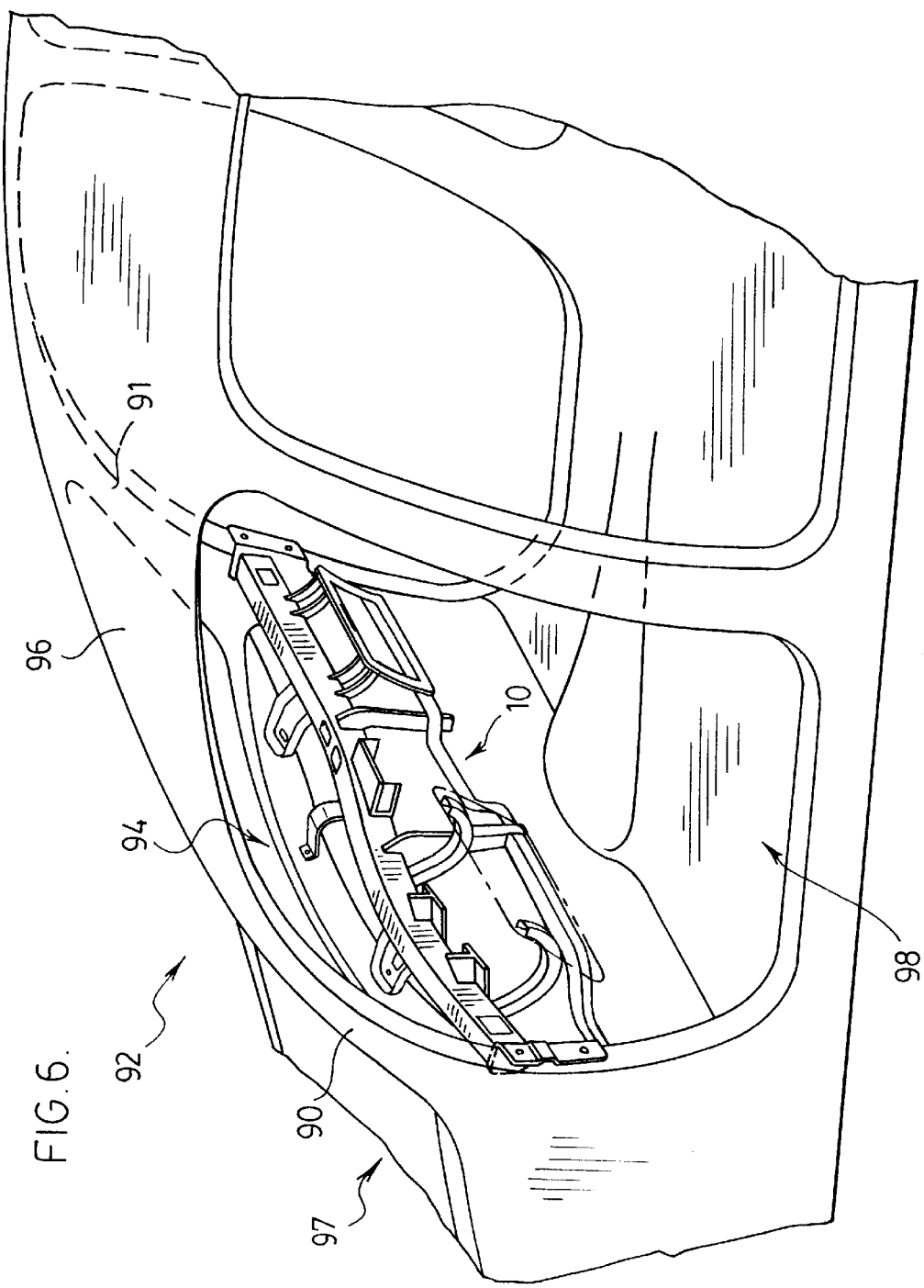

CROSS CAR SUPPORT STRUCTURE

SCOPE OF THE INVENTION

This invention relates to a cross car support structure for an automotive vehicle body.

BACKGROUND OF THE INVENTION

Many automotive vehicle bodies have a frame with a pair of vertical pillars on the opposite sides of the vehicle body at the juncture of an engine compartment and a passenger compartment. The pillars are connected by a crossbeam structure at the cowl of the vehicle body forward of an instrument panel. The cross beam structure provides cross car stiffness, assist in managing side load impacts and supports the steering column and air bags. As well, the cross beam structure provides support for the dashboard, glove compartment and various instrument clusters. The cross beam structure must have sufficient strength to absorb loading applied to the steering column and forces associated with deployment of driver and/or passenger air bags.

Most automobiles have ducts associated with the dashboard and instrument panel for delivering air in connection with the heating, ventilating and air conditioning (HVAC) system.

Known cross car support structures include those taught in U.S. Pat. No. 5,088,571 to Burry et al, issued Feb. 18, 1992 and U.S. Pat. No. 5,354,114 to Kelman et al, issued Oct. 11, 1994, the disclosure of which is incorporated herein by reference.

Previously known cross car support structures suffer the disadvantages that they are relatively heavy as when produced from plastic or metal plastic composites and when produced from metal, do not provide advantageous internal passageways for use as air passage ducts.

SUMMARY OF THE INVENTION

To at least partially overcome these disadvantages of previously known devices, the present invention provides a cross car structure member including a beam comprising a hollow metal tube extending across the vehicle between the vehicle pillars, preferably, with the interior of the tube being used as a HV/AC duct.

Another object of the present invention is to provide a lightweight cross car support structure.

Another object is to provide a cross car support structure with a tubular metal beam which extends between the vehicle pillars.

Another object is to provide a cross car support structure entirely of aluminum or aluminum alloys and preferably formed by extrusion.

Another object is to provide a cross car support structure including a beam which is an extruded tubular metal member of uniform cross-section extending between the vehicle pillars.

Accordingly, in one aspect the present invention provides an automotive vehicle having side pillars located on opposite sides of a vehicle body at a juncture between a passenger compartment and an engine compartment, improvement comprising a cross car structural member extending across the vehicle between the side pillars, the structural member including a hollow tubular metal beam extending between the side pillars, the beam being of uniform cross-sectional shape throughout its length, preferably with:

the beam having side walls defining a passageway longitudinally of the beam, opening through the side walls of the beam at spaced locations for entry and exit of heating, ventilating or air conditioning air to flow longitudinally of the beam and in or out of the openings.

BRIEF DESCRIPTION OF THE DRAWINGS

FIG. 2 is a pictorial view of the primary beam in the structure of FIG. 1;

FIG. 3 is a view of the beam of FIG. 2 as seen from below in a view normal to the bottom side wall of the beam;

FIG. 4 is a view of the beam of FIG. 2 as seen from the rear in a view normal to the rear side wall of the beam;

FIG. 5 is a cross-sectional view of the beam along section line 5–5' in FIG. 4; and FIG. 6 is a schematic pictorial view of a frame of an automotive vehicle including the cross car support structure of FIG. 1.

DETAILED DESCRIPTION OF THE DRAWINGS

Figure 1:
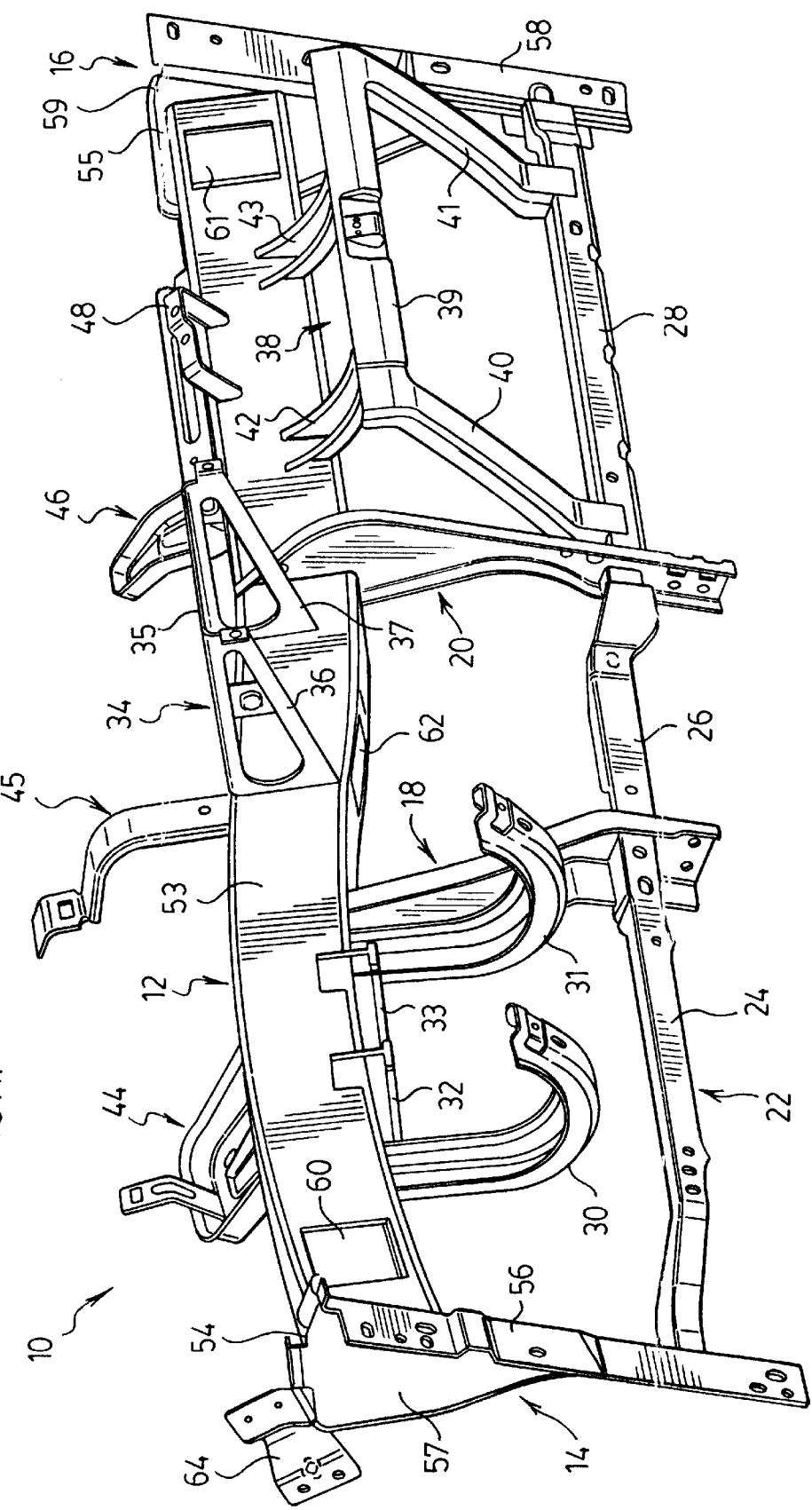
FIG. 1 is a pictorial view of a preferred embodiment of a cross car support structure in accordance with a first embodiment of the present invention.

Reference is made to FIG. 6 which is a schematic pictorial view of a frame 92 of an automotive vehicle showing a cross car support structure 10 of the present invention spanning between left and right side vertical pillars 90 and 91 of the frame 92 such that the structure 10 is disposed rearward of an engine compartment 97 and forward of a passenger compartment 98 proximate a cowl 94 where the lower edge of a windshield 96 joins the frame.

Reference is made to FIG. 1 which is a pictorial view of a cross car support structure 10 in accordance with the present invention including a primary cross beam 12 which extends between a left-hand vertical end bracket member 14 at a left-hand end 54 of the beam 12 and a right hand vehicle end bracket member 16 at the right hand end 55 of the beam. As is known and seen in FIG. 6, the structure 10 is adapted to span between left and right side vertical pillars 90 and 91 on opposite sides of the frame 92, a vehicle body with the primary beam member 12 proximate the cowl 94 of the vehicle, below and forward of a dashboard (not shown) and an instrument panel (not shown) and at a height below that of the windshield 96.

The support structure 10 is for a vehicle with steering on the left-hand side of the vehicle, that is, with a driver's side on the left-hand side and a passenger's side on a right hand side.

The structure 10 further includes left hand intermediate vertical bracket member 18 and right-hand intermediate vertical bracket member 20 which are spaced longitudinally along the beam 12 in between the end bracket members 14 and 16 and extending generally vertically downwardly from the primary beam member 12.

A secondary cross beam member 22 is provided extending generally parallel the primary beam member 12 spaced downwardly therefrom and also joining the end bracket members 14 and 16 and the intermediate bracket members 18 and 20. The secondary cross beam member 22 is comprised of sections including a left section 24, a centre section 26 and a right section 28. The secondary cross beam member 22 spans between the end vertical bracket member 14 and the end vertical bracket member 16 at the lower ends thereof spaced from the primary beam 12 extending to pass between the lower ends of the intermediate bracket members 18 and 20.

The support structure 10 is adapted to support a steering wheel column (not shown) and, in this regard, the primary beam 12 carries a left steering wheel column lower support bracket 30, a right steering wheel column lower support bracket 31, a left steering wheel column upper support bracket 32 and a right steering wheel column upper support bracket 33. As is to be appreciated, the four brackets 30, 31, 32 and 33 can be utilized to securely support a steering wheel column to the primary beam 12.

To support the centre of a dashboard deck (not shown), a dashboard deck upper support assembly 34 is provided including a generally horizontally extending deck plate 35 supported by two vertical brackets 36 and 37.

To support a glove compartment tray and door, a glove compartment support assembly 38 is provided comprising an upper horizontal frame member 39 and two vertical side frame members 41 and 42. The horizontal frame member 39 is coupled to the primary beam 12 by brackets 42 and 43. The vertical side frame members 41 and 42 are connected at their top to the horizontal frame member 39 and at their bottoms to the secondary beam member 22.

To connect the support structure 10 as, for example, to a bulkhead between the engine compartment and the passenger compartment, connection brackets are provided. In FIG. 1, these connection brackets are shown as forward connection brackets 44, 45 and 46 which are each coupled at their rear end to the primary beam 12 and extend forwardly thereof.

Various brackets may be provided, for example, to support the dashboard and instrument cluster and a generally U-shaped dashboard right connection bracket 48 is shown coupled to the primary beam member 12.

It is to be appreciated that the cross car support structure 10 is adapted for securing to various other elements of the framework of the vehicle frame. For example, the left-hand end vertical bracket member 14 is shown as including two flanges 56 and 57 disposed substantially normal to each other with the flange 57 closing the end 54 of the primary beam 12. This flange 57 also carries a coupling bracket 64. Together, the coupling bracket 64 and the flange 57 of the left-hand end vertical bracket member 14 are adapted for coupling the cross car support structure to the left-hand pillar of the vehicle frame.

The right hand vertical end bracket member 16 also includes two flanges 58 and 59 with the flange 58 adapted to close the end 55 of the primary beam 12 and with the flanges provided with various openings for coupling to the right hand vertical pillar of the vehicle frame.

The lower ends of each of the intermediate bracket members 18 and 20 are adapted for coupling at their lower ends of the framework of the vehicle body.

Reference is made to FIGS. 2 to 5 which show the primary cross beam 12. FIG. 2 shows a pictorial view of the beam 12 and showing the beam to have side walls including a top side wall 50, a bottom side wall 51, a front side wall 52 and a rear side wall 53.

The primary beam 12 extends as a continuous hollow tube of uniform cross-section from its left-hand end 54 to its right-hand end 55. FIG. 3 comprises a top view of the primary beam 12 as seen in a view normal to the top side wall 50. FIG. 4 comprises a rear view of the primary beam member 12 normal to the rear side wall 53.

As can be seen in FIG. 3, in the preferred embodiment, the beam 12 extends as a straight linear member with the front side wall 52 and rear side wall 53 each being straight and linear. As seen in FIG. 4, when seen from the rear, the top side wall 50 and rear side wall 53 are not linear but are curved, extending parallel to each other. As may be seen in FIG. 3, the primary cross beam 12 and particularly its top and bottom side walls 50 and 51 are substantially linear between the right hand end vertical bracket member 16 and the right hand intermediate vertical bracket member 20. However, the primary beam 12 is of arcuate form and curves upwardly between the left-hand end vertical bracket member 14 and the right hand intermediate vertical bracket member 20 such that the primary beam 12 curves upwardly and over the location where a steering wheel column is to be supported with, for example, an upper apex to be located generally centrally between the left and right steering wheel column upper support brackets 32 and 33.

The primary beam 12 is provided with a plurality of openings through its side walls indicated as openings 60 and 61 at each end of the rear side wall 53 and openings 62 and 63 in the bottom side wall 51. It is to be appreciated that as many such openings may be provided as is desired.

FIG. 5 shows a cross-sectional end view of the primary beam 12 and shows that the beam 12 comprises a hollow beam having an interior passageway 66 which extends longitudinally throughout the length of the beam surrounded by the side walls 50, 51, 52 and 53 and with openings being provided into this interior passageway 66 to permit entrance and exit of air which may be circulated therethrough as part of the heating, ventilating or air conditioning system of a vehicle, not otherwise shown. It is also to be appreciated that openings can be provided into the interior passageway 66 at each of the ends 54 and 55 of the beam as, for example, by providing openings through the flanges 57 and 59 of the end bracket members 14 and 16 although no such openings are shown in the preferred embodiment.

The primary beam 12 is preferably formed from metal by an extrusion process. After discharge from the extrusion process, the beam 12 may be deformed to assume the curved shape as seen, for example, in FIG. 4. Providing the primary beam member 12 so as to remain of a linear configuration as shown in FIG. 3 when viewed from its front or rear, is of assistance such that deformation of the beam needs only to be accomplished in one direction.

Providing the primary cross beam 12 to be an extruded metal beam member provides a very lightweight structure with desired strength characteristics. The openings for passage of air through the primary beam 12, such as openings 60, 61, 62 and 63 can be provided to not significantly reduce the strength characteristics of primary beam 12.

The various bracket members which are coupled to the primary beam 12 and the secondary beam member 22 are preferably formed from metal sheeting forming into generally T-shape, L-shape, I-shape or U-shape configurations to provide enhanced rigidity. Preferably, the various bracket members will also comprise metal. Preferably, the metal of the bracket members and the secondary cross beam member is substantially the same metal as that utilized for the primary beam 12. More preferably, such metal is aluminum, or aluminum alloys, preferably aluminum magnesium alloys which are relatively lightweight. Preferably, the junctures between the primary beam and the various bracket members and secondary beam member 22, are junctures whereby the metal is welded or otherwise fused together to provide enhanced strength and rigidity and particularly without the need for mechanical fasteners.

Manufacturing the entire cross car support structure 10 shown in FIG. 1 to be of the same or substantially the same metal and all welded, braised, fused or suitably soldered together as integral unit provides a lightweight structure with enhanced rigidity and strength characteristics developed having regard to the particular structure and construction of each of the various components.

The preferred primary cross beam 12 shown has a cross-section which is shown to be rectangular and, preferably, a square in cross-section as is believed advantageous for enhanced strength and vibration reduction. Providing the primary beam 12 to have flat side surfaces is believed to be preferred to assist in the mating of surfaces of the various bracket members to the side surfaces of the primary beam and is believed to assist in ensuring enhanced coupling of any end surface of a bracket member to the primary beam 12.

The primary beam 12 may have other profiles than a square rectangular profile although it is preferred that primary beam member be polygonal or at least have some side surfaces which are planar.

The preferred primary beam 12 is shown to have a longitudinal centre axis provided at the geometric centre of its central passageway. It is to be appreciated that with the preferred embodiment, the longitudinal centre axis is linear over the right hand portion of the beam 12 and is curved in one plane and linear in a second plane over the left-hand portion of the beam 12. It is to be appreciated that the longitudinal centre of the primary beam member could be linear over its entire length, or could be curved and non-linear over its entire length. The particular adaptation of the primary beam member so as to be curved or linear does not significantly effect or alter the characteristics of the cross car support structure 10, however, it is believed preferred to have an arched configuration of the primary beam member which arches-upwardly from one side pillar over the location of the steering wheel column and then downwardly to approximately the centre of the primary beam member. This arching is believed to provide for enhanced resiliency to side impact loading.

In the preferred embodiment as shown in FIG. 1, the cross car support structure 10 is shown as disposed in an orientation that it would assume in a vehicle with the vehicle having its wheels resting on a horizontal surface. In this regard, each of the flanges 56 and 58 of the end bracket members 14 and 16 are adapted to be disposed substantially vertical and the primary beam 12 is adapted to be disposed with its rear side wall 53 disposed at an angle to the vehicle preferably in a plane extending at an angle disposed in a plane facing upwardly and disposed at about 20° to a vertical. Preferably, the primary beam 12 would be disposed with its rear side wall 53 disposed in a plane in arranged between about 30° and 10° to a vertical. As seen in FIG. 3, the linear section of the primary beam 12 between the bracket member 16 and the bracket member 20 is disposed to be horizontal.

While the invention has been described with reference to a preferred embodiment, the invention is not so limited. For a definition of the invention, reference is made to the following claims.

We claim:

1. In an automotive vehicle having side pillars located on opposite sides of a vehicle body at a juncture between a passenger compartment and an engine compartment, improvement comprising a cross car structural member extending across the vehicle between the side pillars, the structural member including a hollow tubular metal beam extending between the side pillars, the beam being of uniform cross-sectional shape throughout its length, the beam having side walls defining a passageway longitudinally of the beam, opening through the side walls of the beam at spaced locations for entry and exit of heating, ventilating and air conditioning air to flow longitudinally of the beam and in or out of the openings;

the beam comprises aluminum or an aluminum alloy; and wherein the beam is formed by extrusion and after extrusion is bent such that at least a portion of a longitudinal through the beam assumes a non-linear configuration.

2. A cross car structural member as claimed in claim 1 wherein the beam is generally rectangular in cross-section.

3. A cross car structural member as claimed in claim 1 wherein the beam includes side walls defining a hollow interior within the beam, the hollow interior providing a passageway for air of the heating, ventilation and air conditioning system to move longitudinally of the beam through the hollow interior, openings through the beam for entry and exit of air into the hollow interior.

4. A cross car structural member as claimed in claim 3 wherein the beam has ends which are closed to close ends of the passageway.

5. A cross car structural member as claimed in claim 3 including a substantially vertical end bracket member coupled to each end of the beam and adapted to couple each end of the beam to vertical pillars on opposite sides of the vehicle body, wherein the end bracket members comprise aluminum or an aluminum alloy and are welded to the beam.

6. A cross car structural member as claimed in claim 5 including a secondary cross beam member, the secondary cross beam member extending substantially parallel to the beam and being spaced vertically at a height below the beam spaced therefrom, each of the end bracket members extending vertically from the beam to lower ends thereof which are bridged and joined by the secondary cross beam member.

7. A cross car structural member as claimed in claim 8 including at least one intermediate vertical bracket members coupled at an upper end to the beam and extending generally vertically downwardly to the secondary beam member, each intermediate bracket member spaced laterally from adjacent end bracket members and any other intermediate bracket members, wherein each of the intermediate bracket members and the secondary cross beam member comprise aluminum or an aluminum alloy and each are welded together so as to provide the cross car support structure as a unitary element formed entirely out of the aluminum or an aluminum alloy.

8. In an automotive vehicle having side pillars located on opposite sides of a vehicle body at a juncture between a passenger compartment and an engine compartment, improvement comprising a cross car structural member extending across the vehicle between the side pillars, the structural member including a hollow tubular metal beam extending between the side pillars, the beam being of uniform cross-sectional shape throughout its length, the beam having side walls defining a passageway longitudinally of the beam, opening through the side walls of the beam at spaced locations for entry and exit of heating, ventilating and air conditioning air to flow longitudinally of the beam and in or out of the openings;

wherein the beam includes a section with an arched configuration where the beam curves upwardly and then downwardly with an upper apex centered above a location of a steering wheel column on a driver's side of the vehicle.

9. A cross car structural member as claimed in claim 8 wherein the beam also includes a linear section extending from the arched section across a passenger's side of the vehicle.

10. In an automotive vehicle having side pillars located on opposite sides of a vehicle body at a juncture between a passenger compartment and an engine compartment, improvement comprising a cross car structural member extending across the vehicle between the side pillars, the structural member including a hollow tubular metal extended beam extending between the side pillars, the beam being of uniform cross-sectional shape throughout its length, the structural member including a pair of end bracket members with one end bracket member coupled to each end of the beam and adapted to couple each end of the beam to vertical pillars on opposite sides of a vehicle body, the structural member further including auxiliary structural members for securing the structural member to a frame of a vehicle and for supporting a steering wheel column, the entirety of the structural member formed from aluminum or aluminum alloy with the beam, and bracket members and structural members interconnected substantially only by welding;

wherein the beam includes a section with an arched configuration where the beam curves upwardly and then downwardly with an upper apex centred above a location of a steering wheel column on a driver's side of the vehicle.

11. A cross car structural member as claimed in claim 10 wherein the beam is generally rectangular in cross-section.

12. In an automotive vehicle having side pillars located on opposite sides of a vehicle body at a juncture between a passenger compartment and an engine compartment, improvement comprising a cross car structural member extending across the vehicle between the side pillars, the structural member including a hollow tubular metal extended beam extending between the side pillars, the beam being of uniform cross-sectional shape throughout its length, the structural member including a pair of end bracket members with one end bracket member coupled to each end of the beam and adapted to couple each end of the beam to vertical pillars on opposite sides of a vehicle body, the structural member further including auxiliary structural members for securing the structural member to the frame of a vehicle and for supporting a steering wheel column, the entirety of the structural member formed from aluminum or aluminum alloy with the beam, and bracket members and structural members interconnected substantially only by welding;

wherein the auxiliary structural bracket members include a secondary cross beam member and at least one intermediate vertical bracket member, the secondary cross beam member extending substantially parallel to the beam and being spaced vertically at a height below the beam spaced therefrom, each of the end bracket members extending vertically from the beam to lower ends thereof which are bridged and joined by the secondary cross beam member, each intermediate bracket member spaced laterally from adjacent end bracket members and any other intermediate bracket members.

13. A cross car structural member as claimed in claim 12 wherein the beam includes a section with an arched configuration where the beam curves upwardly and then downwardly with an upper apex centred above a location of a steering wheel column on a driver's side of the vehicle.

14. A cross car structural member as claimed in claim 13 wherein the beam also includes a linear section extending from the arched section across a passenger's side of the vehicle.

15. A cross car structural member as claimed in claim 14 wherein the beam is generally rectangular in cross-section.

* * * * *